Nov. 8, 1932.    O. B. WENDELN    1,887,052
FILTER
Filed March 12, 1929

Inventor
Oliver B. Wendeln
By H. A. McDowell
Attorney

Patented Nov. 8, 1932

1,887,052

UNITED STATES PATENT OFFICE

OLIVER B. WENDELN, OF NEDERLAND, TEXAS, ASSIGNOR TO THE PURE OIL COMPANY, OF CHICAGO, ILLINOIS, A CORPORATION OF OHIO

FILTER

Application filed March 12, 1929. Serial No. 346,345.

This invention relates to improvements in filters and has for its primary object the provision of improved means for removing solids from gases or vapors.

In the refining of oils frequent use is made of finely divided clays, such as fuller's earth, for the purpose of removing from the oils certain undesirable compounds, particularly compounds which tend to discolor or to produce gum deposits in the oils. In accordance with certain refining methods the fuller's earth is intimately mixed with the oil while the latter is in a heated or vaporous condition for the purpose of securing polymerization reactions in the oil by which the undesirable compounds are taken out. After the oils have been so treated some difficulty has been encountered in removing therefrom the clay treating materials. It is therefore one of the outstanding objects of the invention to provide an improved filter in which is embodied a screen element into which the combined oil vapors and treating materials are passed, the construction of the screen element being such as to permit the oil vapors to pass readily therethrough but the interstices of the screen element are such as to obstruct or prevent the passage of the solids therethrough, provision being made for the collection of the solids and their separate withdrawal from the filter as regards the clay free oil vapors.

It is another object of the invention to maintain the oil vapors at a temperature sufficiently high to maintain the fuller's earth, or other treating solids, in a substantially dry condition in order that the clay materials, after striking the screen element will drop by gravity therefrom into a conveniently arranged collecting zone.

With these and other objects in view which will appear as the description proceeds, the invention consists in the novel features of construction, combinations of elements and arrangements of parts hereinafter to be fully described and pointed out in the appended claims.

Figure 1:
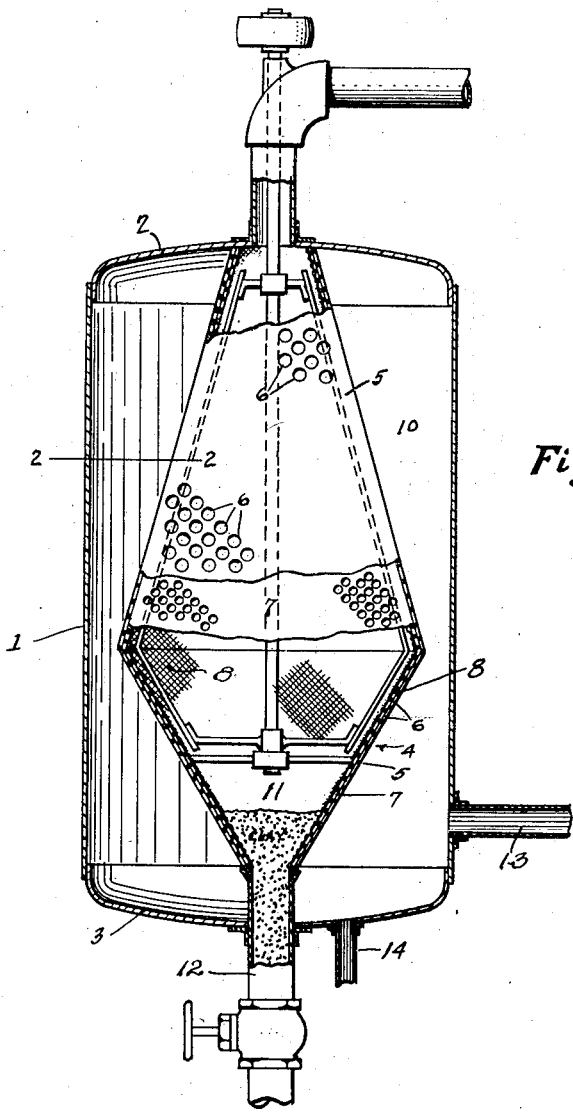
Figure 2:
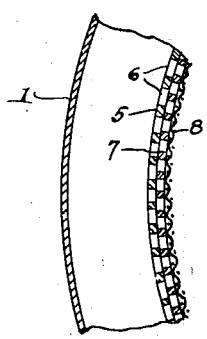

In the accompanying drawing:

Figure 1 is a vertical sectional view taken through a filter formed in accordance with the present invention, Figure 2 is a horizontal sectional view on the line 2—2 of Figure 1, Referring more particularly to the drawing the filter illustrated therein which, it will be understood, constitutes but one form of the invention, comprises a casing 1 of cylindrical formation and of substantially uniform diameter throughout its length or height. The upper end of the casing is closed by a crowned cover plate 2, while the lower end of the casing is closed by a similarly formed bottom plate 3. Arranged within the casing is a screen element 4. This screen element consists preferably of a double cone shaped body having its largest diameter at a position intermediate of its ends.

Structurally the screen element comprises an outer metallic shell 5 which may be formed from 1/4 inch sheet metal plate and is provided, for example, with a plurality of 1/2 inch holes disposed on 3/4 inch centers, said holes or apertures being designated by the numeral 6. It will be understood that the dimensions given are merely illustrative and may be changed from time to time if practice so dictates. Disposed around the interior of the shell and in close engagement with the inner walls thereof is a thinner sheet metal plate of, for example, 20 gauge. This plate is designated by the numeral 7 and is provided with a plurality of 1/8 inch holes arranged, for example, on 1/4 inch centers. The plate 7 is placed directly against the inner wall of the shell 5 and conforms to the configuration thereof. Then, placed against the inner wall of the plate 7 is a fine wire screen consisting preferably of 200 mesh Monel metal cloth, which is designated by the numeral 8. The plate 7 and the screen material 8 are held firmly and rigidly within the shell 5 by suitable fastening elements to prevent loss of position. The shell 5, or the screen element as a whole is stationarily mounted in any suitable way within the casing 1.

Entering the top of the casing is an inlet vapor line 9 through which oil vapors at a temperature of, for example, 500 or 600 degrees F., together with the clay treating materials enter the screen element. Due to the fine interstices of the screen 8 and the arrangement of the openings in the shell 5 and the plate 7 the oil vapors are permitted to pass through the walls of the screen element and to enter the vapor space 10 within the casing 1 around the element 4. The clay treating material, however, because of its greater body or the size of its particles cannot pass through the walls of the perforate screen unit but is confined within the screen unit, permitting, therefore, the oil vapors to enter the space 10 substantially free of the solid treating materials.

Due to the fact that the oil vapors are at a relatively elevated temperature the clay is maintained in a substantially dry condition and does not adhere appreciably to the inner walls of the screen element, but falls by gravity into the clay receiving space 11 provided at the bottom of the screen element. This action is facilitated by reason of the double cone formation of the screen element. It will be observed that the upper portion of the screen element is of frusto-conical form having downwardly and outwardly sloping walls. Due to this inclination of the walls of the upper portion of the screen element the clay tends to drop from the walls of the screen element into the space 11. If the temperature of the oil vapors is sufficiently low so that there is some condensation or liquefaction of the higher boiling compounds, then the clay may be in a somewhat moist condition and would tend to adhere to a greater extent to the walls of the screen unit. If such a condition exists the interior of the screen unit may be provided with a rotatable scraper (not shown) to maintain the walls of the screen unit sufficiently pervious for the passage of the oil vapors therethrough. However, by the action of the higher vapor temperatures the resultant dry condition of the clay permits the latter to fall readily to the bottom of the screen unit. The bottom of the unit is provided with a clay outlet pipe 12 by which the clay may be removed from the bottom of the filler for treatment or storage purposes.

The clay free oil vapors which enter the space 10 are removed from the casing 1 by way of an outlet pipe 13, arranged near the bottom of the casing and may be lead to suitable fractionating and condensing apparatus (not shown). If there is any condensation of the oil vapors within the space 10, such condensate may be removed by way of the small pipe line 14, which is arranged independently of the vapor outlet 13.

In view of the foregoing it will be seen that the present invention provides simple yet efficient apparatus for effecting the removal of clay treating materials or other solids from fluids such as heated oil vapor. The apparatus has the advantage of permitting of continuous operation, that is to say, continuous vapor flow. In practice it has been found desirable to employ two or more screen units so that in the event one of such units, after a certain period of operation, loses its efficiency by reason of, for example, excessive clay deposit on the walls of the screen unit, the vapors may be transferred to a companion screen unit, thus eliminating from the system the inefficient unit in order that the latter may be cleaned of the obstructing materials and rendered suitable for effective future service. The cleaning of a unit may be effected by passing therethrough superheated steam or by any other convenient method desired. The present invention eliminates the employment of expensive and slowly operating filter presses which have been largely used heretofore to remove the treating materials from liquid oils. Thus in prior practice it has been customary to fractionate the oil vapors to provide for the separation of the desirable and undesirable fractions, the undesirable fractions which contained the clay having been reduced to liquid form, were then forced through the screens of a filter press. This involves the use of complicated apparatus and produces a relatively slow and costly method. In the present invention the filter operates with the oil in the vapor phase which constitutes the outstanding differences over prior methods of clay recovery. The advantages of the vapor phase method reside chiefly in the simplicity of the apparatus, continuous operation, effective clay removal and economy in operation.

While I have described specifically one of the preferred forms of my improved filter, nevertheless, it will be understood that the invention is not limited in its scope to the specific construction as set forth but may be embodied in and carried out by other widely different, in a structural sense, forms of apparatus.

What is claimed is:

1. In a filter of the class described, a casing formed to include a substantially closed chamber, a rigid walled screen unit of conical form arranged within said chamber, said unit being formed to include a perforate outer metallic shell, a perforate plate arranged in engagement with the inner walls of said shell, a fine wire mesh screen engaging with the inner surface of said plate, means for introducing commingled oil vapor and finely divided clay into said screen unit to permit of the passage of the oil vapor through the perforate walls of the screen unit into said chamber, said perforate walls serving to obstruct the passage of the clay therethrough, a vapor outlet leading from said chamber and a clay outlet leading from the interior of the screen unit.

2. In apparatus for separating solids from vaporized liquids, a casing formed to include a substantially closed chamber, a rigid walled screen unit positioned within said chamber and spaced from the inner walls thereof, said screen unit being formed to comprise a perforated outer metallic shell, an inner perforated shell nested within the outer shell and in contact therewith, a fine wire screen of close mesh nested within the inner shell and in contact therewith, means for introducing a substantially vaporized liquid commingled with a finely divided solid into the interior of said screen unit in order that the vaporized liquid alone may pass through the interstices and perforations of the wall forming members of the screen unit, and means for removing the separated solids from the interior of the screen unit and the separated vapors from the chamber surrounding the screen unit.

In testimony whereof I affix my signature.

OLIVER B. WENDELN.